July 17, 1923.

R. S. TROGNER

TIRE MACHINE

Filed Sept. 29, 1919

Inventor

Roland S. Trogner

By

Attorney

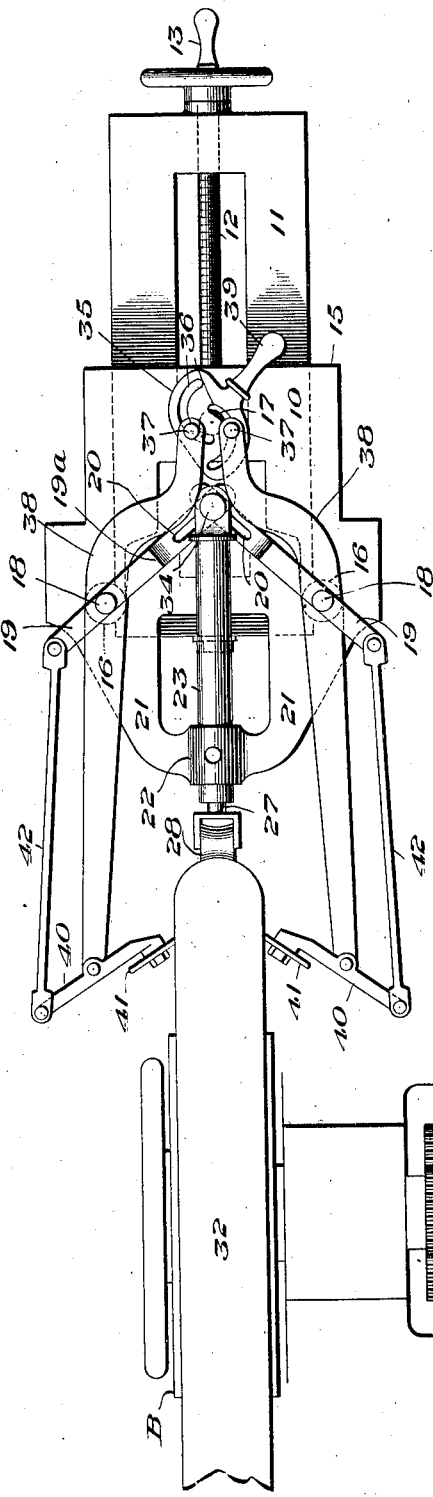

Patented July 17, 1923.

1,462,465

UNITED STATES PATENT OFFICE.

ROLAND S. TROGNER, OF AKRON, OHIO, ASSIGNOR TO THE GOODYEAR TIRE & RUBBER COMPANY, OF AKRON, OHIO, A CORPORATION OF OHIO.

TIRE MACHINE.

Application filed September 29, 1919. Serial No. 327,129.

*To all whom it may concern:*

Be it known that I, ROLAND S. TROGNER, a citizen of the United States, and resident of Akron, Ohio, have invented new and useful Improvements in Tire Machines, of which the following is a specification.

My invention relates to a combined stitcher and tread roll used in the manufacture of pneumatic tires.

Hitherto it has been customary to perform the tread rolling and stitching operations as single successive operations, which were independent one of the other.

It is an object of my invention to provide a combined stitcher and tread roll, the elements of which simultaneously cooperate to perform their functions.

It is a further object of my invention to provide stitching mechanism which will semi-automatically adjust itself so as to engage the core on which the fabric has been wound, at a proper angle.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which similar reference numbers designate corresponding parts:

Figure 3 is a top plan view showing the core, the means for revolving the same and the apparatus with the parts in the position they assume when the stitching operation is completed;

Figure 4 is a detail of the stitcher mechanism; and

Figure 5 is a detail section of the same on line 5—5 of Figure 4.

Figure 1:
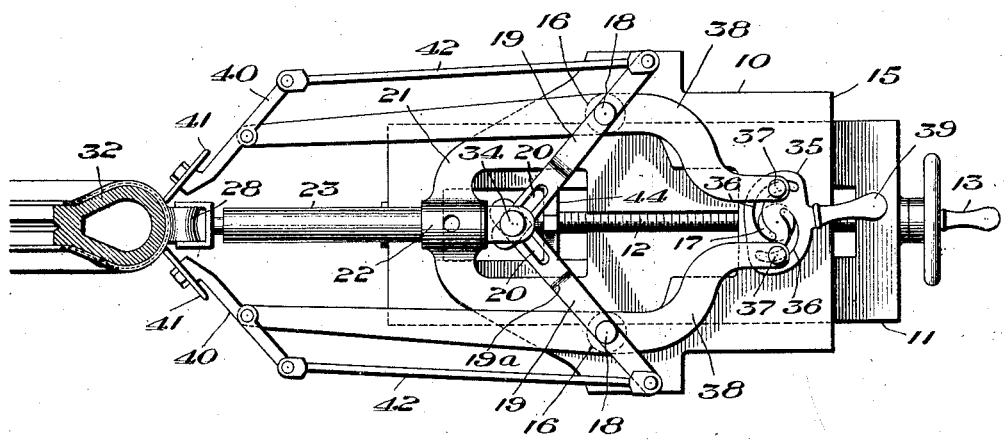
Figure 1 is a plan view of an apparatus constructed in accordance with my invention.
Figure 2:
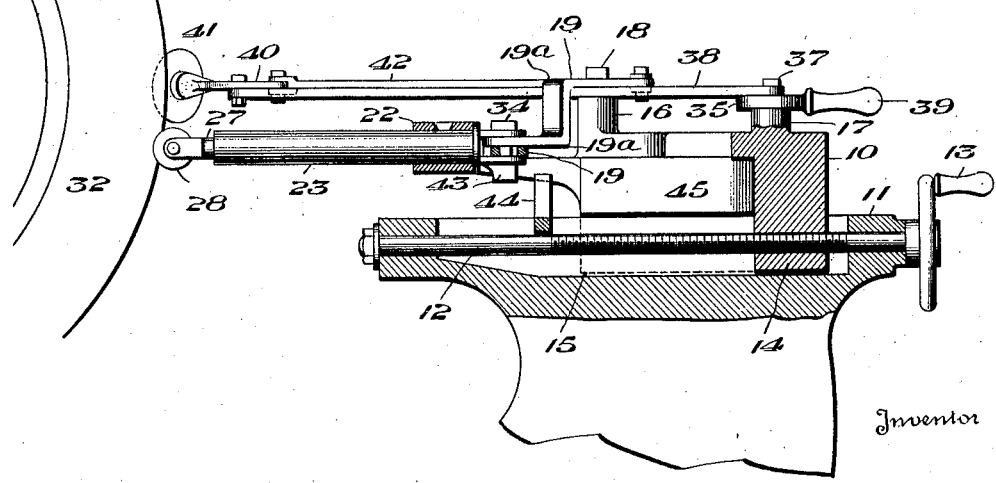
Figure 2 is a side elevation of the same.

A longitudinally reciprocable carriage 10 is mounted on a standard 11, and is adapted to be moved toward and away from the core on which the tire is built up. This adjustment is effected by a horizontal screw-threaded shaft bearing an operating handwheel 13.

A depending screw-threaded eye 14 through which the screw-threaded shaft 12 passes, is adapted to cooperate therewith, whereby the carriage 10, provided with suitable guiding flanges 15 is moved forward and back by the operation of the handwheel 13.

Upon the upper surface of the carriage 10 at the outer edges thereof are two oppositely disposed upstanding lugs 16, and a third lug 17 disposed in a longitudinal median line of the carriage 10.

Pivotally mounted on the top of the lugs 16 by means of suitable pins 18, are arms 19, each having two right angle bends 19$^a$; those portions of the arms in the lower plane being slotted at 20.

The carriage 10 has a bracket 21 extending therefrom, which has at its middle portion a boss 22, through which slides a cylindrical member 23. The cylindrical member 23 is recessed at one end, as at 24, for the reception of a piston 25 which is normally pressed outward by means of a spring 26 and has secured thereto a piston rod 27, on the outer end of which a tread roll 28 is mounted. A suitably feathered bushing 29, the spline 30 of which fits in a key way 31 of the piston rod 27, serves as bearing for the latter. It will be seen that the tread roll is thus pressed outward against a core 32, on which fabric is adapted to be wound in building up the tire.

The end of the cylindrical member 23 opposite to the recessed portion 24 is bifurcated as at 33 and pinned to the arms 19 by a pivot pin 34, passing through the bifurcations and through the slots 20 of both arms 19.

The lug 17 has pivotally mounted thereon a plate 35 provided with cam slots 36. To the plate 35 are connected by means of studs 37, passing through the cam slots 36, a pair of similar oppositely arranged arms 38, the studs 37 being carried by the arms 38. A handle 39 is fixed to the plate 35 to swing the latter about its pivot for a purpose that will presently appear.

The arms 38 are, like the arms 19, pivotally mounted on the lugs 16 by the means of the pivot pins 18, and have pivoted to the ends thereof a pair of levers 40, bearing at the inner ends thereof, stitchers, which consist in the present embodiment, of revoluble discs 41. The outer ends of the levers 40 are connected to the outer ends of the arms 19 by links 42, so as to form two parallelograms, one being formed by each set of arms and links.

In Figure 3 the core revolving device is shown and consists of a motor A for driving the chuck B on which the core 32 is mounted in the usual manner.

The operation will now be apparent and is, in brief, as follows:

Assuming that the carriage 10 is withdrawn from the core 32, a ply of fabric is first wound on the revoluble core 32, and the handwheel 13 turned to advance the carriage 10 toward the core, so that the tread roll 28 will engage the periphery of the fabric covered core. The carriage is slowly moved forward continuously and uniformly by the handwheel 13, the stitchers 41 being at first in the position shown in full lines in Figure 1. As the carriage 10 is moved forward, the tread roll 28 bears with greater pressure on the core, and moves the piston 25 against the tension of the spring 26, compressing the latter. The spring at the same time acts to take up vibrations and compensates for any unevenness of the core. As the tread roll 28 abuts the core 32 the pivot pin 34 holds the inner ends of the arms 19 against further forward movement, whereby said arms will be swung upon their respective pivots 18 as the carriage 10 continues in its forward movement. The links 42 will swing the levers 40 upon the arms 38 and the stitchers 41 will be positioned at the required angle against the fabric.

The arms 38 being mounted on the carriage 10 will move forward therewith, so that not only will the stitchers move from the outermost periphery of the core to the base, but they will swing around the peripheral portion of the core with a progressively changing angle to a plane passing through the circumferential axis. Further, as the stitchers leave the approximately circular portion of the periphery of the core, considering the cross-section of the core periphery as shown in Figure 1, they change their angular relation to the fabric. It is to be noted also that while the stitchers are on the circle, they maintain substantially the same angle to a line tangent to the circle referred to; and are approximately normal thereto.

These or similar movements of the stitchers with relation to core periphery stitch down the fabric, in an approved manner, pressing out the air from beneath the same and causing the fabric to adhere smoothly and closely to the core and to the plies of fabric wound thereon, as well as stretching the fabric at the proper places and to the right degree.

The pressures with which the stitchers 41 bear against the core 32 are controlled and regulated by the manipulation of the handle 39 and proper contact between the stitchers and core is thus always insured.

In order to return the stitchers 41, and tread roll 28 from the position illustrated in Figure 3, to their normal position to stitch another ply of fabric, the stitchers 41 are first moved away from the core to clear them from the same by operating the handle 39 to swing the arms 38 about the pins 18. The handwheel is now revolved to withdraw the carriage 10, and the parts carried thereon away from the core. When the carriage 10 has been withdrawn a distance sufficient to withdraw the tread roll 28 from contact with the core 32, a lug 43, upon the rear end of the cylinder 23, contacts with an upstanding abutment 44 upon the standard 11. By means of lug 43 and abutment 44 the the cylinder 23 is held against further movement and the pivot pin 34 becomes a fixed fulcrum about which the arms 19 will swing, upon further movement of the carriage from the core to again position links 42, levers 40, and stitchers in the position illustrated in Figure 1. In order that the carriage 10 may move freely past the abutment 44 upon its forward movement, a longitudinal slot 45 is provided centrally of said carriage.

From the foregoing it will be seen that I have provided a comparatively simple combined tread roll and stitcher; the parts of which so cooperate as to progressively move the stitchers around the core and in such a way that the latter will maintain a suitable relation to the fabric to stitch down the same uniformly, and at the same time permit the adjustment of the stitchers to vary or maintain constant the pressure of the stitchers against the fabric.

Changes and modifications of the apparatus may be made, that come within the scope of the appended claims, without in any sense departing from the essence of my invention.

What I claim is:

1. In an apparatus of the character described, the combination with a rotatable core, of a tread roll, and a stitcher adapted to traverse the side of the core, said stitcher being connected to the tread roll for simultaneous operation therewith.

2. In an apparatus of the character described, the combination of a tread roll and a stitcher together with means for connecting said tread roll and said stitcher, whereby the movement of one affects the relative movement of the other.

3. In an apparatus of the character described, in combination, a tread roll, an adjustable support for said tread roll, a stitcher, connecting means between said tread roll and said stitcher, whereby upon adjustment of said support, said stitcher is caused to move relatively to said tread roll.

4. In an apparatus of the character described, in combination, a tread roll adapted to be moved into contact with a revoluble core, means for moving said tread roll to contact with the core, a stitcher, means connecting said tread roll and said stitcher, whereby upon the operation of said moving means to bring said tread roll more firmly against the core, said stitcher is moved relatively to the core.

5. In an apparatus of the character described, in combination, a tread roll adapted to be moved into contact with a revoluble core, means for moving said tread roll to contact with the core, a stitcher, means connecting said tread roll and said stitcher, whereby upon the operation of said moving means to bring said tread roll more firmly against the core, said stitcher is moved relatively to the core and to said tread roll.

6. In an apparatus of the character described, in combination, a tread roll adapted to be moved into contact with a revoluble core, an element on which said tread roll is mounted, means for moving said element and tread roll toward said core, a stitcher mounted on said element, means connecting said tread roll and said stitcher whereby upon movement of said element to bring said tread roll into contact with the core, said stitcher is caused to move at a progressively changing angle to said tread roll.

7. In an apparatus of the character described, in combination, a tread roll adapted to be moved into contact with a revoluble core, a support for said tread roll, a plurality of arms mounted on said support, stitchers carried by said arms, linkage mechanism connecting said arms with said tread roll, and means for moving said support to bring said tread rolls and said stitchers into contact with the core.

8. In an apparatus of the character described, in combination, a tread roll adapted to be brought into contact with a revoluble core, a support for said tread roll, a pair of pivoted arms mounted on said support, a lever pivoted on each arm, a stitcher carried by each lever, links connecting said levers with said tread roll and means for moving said support to bring said tread roll and stitchers into contact with the core and upon further movement in the same direction to cause said stitcher to assume progressively changing angles to said tread roll.

9. In an apparatus of the character described, in combination, a tread roll adapted to be brought into contact with a revoluble core, a support for said tread roll, a pair of pivoted arms mounted on said support, a lever pivoted on each arm, a stitcher carried by each lever, links connecting said levers with said tread roll and means for moving said support to bring said tread roll and stitchers into contact with the core and upon further movement in the same direction to cause said stitchers to assume progressively changing angles to the core.

10. In an apparatus of the character described, in combination, a tread roll adapted to be brought into contact with a revoluble core, a support for said tread roll, a pair of pivoted arms mounted on said support, a lever pivoted on each arm, a stitcher carried by each lever, a second pair of arms pivotally mounted on said support, links connecting said levers and said last named arms, and means for moving said support to bring said tread roll and stitchers into contact with the core, and upon further movement in the same direction to cause said stitchers to assume progressively changing angles to said tread roll.

11. In an apparatus of the character described, in combination, a tread roll adapted to be brought into contact with a revoluble core, a support for said tread roll, a pair of pivoted arms mounted on said support, a lever pivoted on each arm, a stitcher carried by each lever, a second pair of arms pivotally mounted on said support, links connecting said levers and said last named arms, and means for moving said support to bring said tread roll and stitchers into contact with the core, and upon further movement in the same direction to cause said stitchers to assume progressively changing angles to the core.

12. In an apparatus of the character described, in combination, a tread roll adapted to be brought into contact with a revoluble core, a support for said tread roll, stitchers, series of arms and links forming parallelograms and connecting said tread roll with said stitchers, and means for moving said support to bring said tread roll and stitcher into contact with the core and upon further movement in the same direction to cause said stitchers to assume progressively changing angles to said tread roll.

13. In an apparatus of the character described, in combination, an adjustable support, an element slidable in said support, a tread roll adapted to be brought into contact with a revoluble core and resiliently connected to said element, stitchers also adapted to be brought into contact with the core and means connecting said stitchers with said element.

14. In an apparatus of the character described, in combination, an adjustable support, a cylindrical member having a recess in one end and slidable in said support, a piston in said recess, a spring cooperating with said piston, a tread roll adapted to be brought into contact with a revoluble core and connected to said piston, stitchers, also adapted to be brought into contact with the core, and linkage mechanism connecting said stitchers with said cylindrical element.

15. In an apparatus of the character described, in combination, a tread roll adapted to be brought into contact with a revoluble core, a support for said tread roll, a stitcher carried by said support, and also adapted to contact with the core, linkage mechanism connecting said tread roll and said stitcher, means for varying the pressure with which said stitcher contacts said core and means for moving said support to bring said tread roll and said stitcher into contact with said core.

16. In an apparatus of the character described, in combination, a tread roll adapted to be moved into contact with a revoluble core, a support for said tread roll, a plurality of stitchers, also adapted to be moved into contact with the core, means connecting said tread roll and said stitchers for causing said stitchers to move about the core and during said movement to remain in planes maintained in substantially constant angular relation to planes tangent to the core at the points of contact with the stitchers, and means for moving said support to bring said tread roll and stitchers into contact with the core.

17. In an apparatus of the character described, in combination, a tread roll adapted to be brought into contact with a revoluble core, a support for said tread roll, stitchers also adapted to be brought into contact with the core, means for changing the angular relation of said stitchers to the core, and means for moving said support to bring said tread roll and said stitchers into contact with the core.

18. In an apparatus of the character described, in combination, a tread roll adapted to be brought into contact with a revoluble core, a support for said tread roll, stitchers also adapted to be brought into contact with the core, means connecting said tread roll and said stitchers for changing the angular relation of said stitchers to the core, and means for moving said support to bring said tread roll and said stitchers into contact with the core.

19. In an apparatus of the character described, in combination, a tread roll adapted to be brought into contact with a revoluble core, a support for said tread roll, stitchers also adapted to be brought into contact with the core, linkage mechanism connecting said tread roll and said stitchers for changing the angular relation of said stitchers to the core, and means for moving said support to bring said tread roll and said stitchers into contact with the core.

20. In an apparatus of the character described, in combination, a tread roll adapted to be brought into contact with a revoluble core, a support for said tread roll, stitchers also adapted to be brought into contact with the core, means for changing the angular relation of said stitchers to the core, means for moving said support to bring said tread roll and said stitchers into contact with the core, and means for varying the pressure of said stitchers on the core.

21. In an apparatus of the character described, in combination, a revoluble core, means for revolving said core, a tread roll adapted to be impinged on said core, stitchers adapted to contact with said core, a common support for said tread roll and stitchers, means for moving said support, mechanism connecting said tread roll and stitchers and for producing relative movement between said tread roll and said stitchers.

22. In an apparatus of the character described, in combination, a revoluble core, means for revolving said core, a tread roll adapted to be impinged on said core, stitchers adapted to contact with said core, a common support for said tread roll and stitchers, means for moving said support, mechanism connecting said tread roll and stitchers and for changing the angular relation of said stitchers to the core, after said tread roll and stitchers have both been brought into contact with the core.

23. In an apparatus of the character described, the combination with a rotatable core, of a tread roller, a stitcher, a support for the roller and stitcher adapted for adjustment toward and away from the core, and operative connections between the roller and stitcher adapted upon adjustment of the carriage to move the stitcher in an arcuate path when the roller contacts with the core.

In witness whereof, I have hereunto signed my name in the presence of two subscribing witnesses.

ROLAND S. TROGNER.

Witnesses:
 JOHN E. KEATING,
 L. M. HARTMAN.